United States Patent [19]

Fleischer et al.

[11] 4,213,037

[45] Jul. 15, 1980

[54] ELECTRICAL COUNTING MECHANISM

[75] Inventors: Donald W. Fleischer, Wethersfield; Einar Asmundsson, Middle Haddam, both of Conn.

[73] Assignee: Veeder Industries Inc., Hartford, Conn.

[21] Appl. No.: 952,716

[22] Filed: Oct. 19, 1978

[51] Int. Cl.[2] .......................... G01C 22/00; G06M 1/04

[52] U.S. Cl. ................................ 235/92 B; 235/92 C; 235/95 R

[58] Field of Search ................. 235/92 B, 92 C, 92 H, 235/95 R, 96, 91 H, 62 F, 144 D, 144 SP, 103; 310/21

[56] References Cited

U.S. PATENT DOCUMENTS

| | | | |
|---|---|---|---|
| 3,151,809 | 10/1964 | Gerstenmaier | 235/92 H |
| 3,502,265 | 3/1970 | Vogtlin | 235/92 B |
| 3,747,848 | 7/1973 | Stothart | 235/92 C |
| 3,997,766 | 12/1976 | Voegelin | 235/92 B |
| 4,009,373 | 2/1977 | Young | 235/92 C |

*Primary Examiner*—Leo H. Boudreau

*Attorney, Agent, or Firm*—Prutzman, Kalb, Chilton & Alix

[57] ABSTRACT

An electrical counting device with a rotary counter, a rotary drive assembly having a driven rotor with a verge for indexing the counter in stepwise fashion and a coaxial drive rotor in frictional engagement with the driven rotor, a coil torsion spring biasing the drive rotor in one angular direction and a tension wire conductor extending angularly about a drum of the drive rotor and connected to be heated and thereby lengthened with an electrical current to index the counter a first one-half count with the torsion spring and a remaining one-half count with the tension wire upon subsequent cooling and contraction thereof.

4 Claims, 4 Drawing Figures

ELECTRICAL COUNTING MECHANISM

BRIEF SUMMARY OF THE INVENTION

The present invention relates generally to electrical counting mechanisms and more particularly to a new and improved electrical counting mechanism having notable utility as a vehicle odometer.

It is a primary aim of the present invention to provide a new and improved electrical counting mechanism having a long maintenance free life as a quiet automobile odometer.

It is another aim of the present invention to provide a new and improved electrical counting mechanism of very low cost and economical design employing inexpensive non-electromagnetic components.

It is a further aim of the present invention to provide a new and improved electrical counting mechanism which may be readily produced in varying configurations for varying applications and with minimum frontal area, for example, for use as an automobile odometer.

It is another aim of the present invention to provide a new and improved low cost, low speed electrical counting mechanism useful in numerous low speed counter applications, for example, in vending machines for counting products dispensed.

Other objects will be in part obvious and in part pointed out more in detail hereinafter.

A better understanding of the invention will be obtained from the following detailed description and the accompanying drawings of an illustrative application of the invention.

DESCRIPTION OF THE PREFERRED EMBODIMENT

Figure 1:
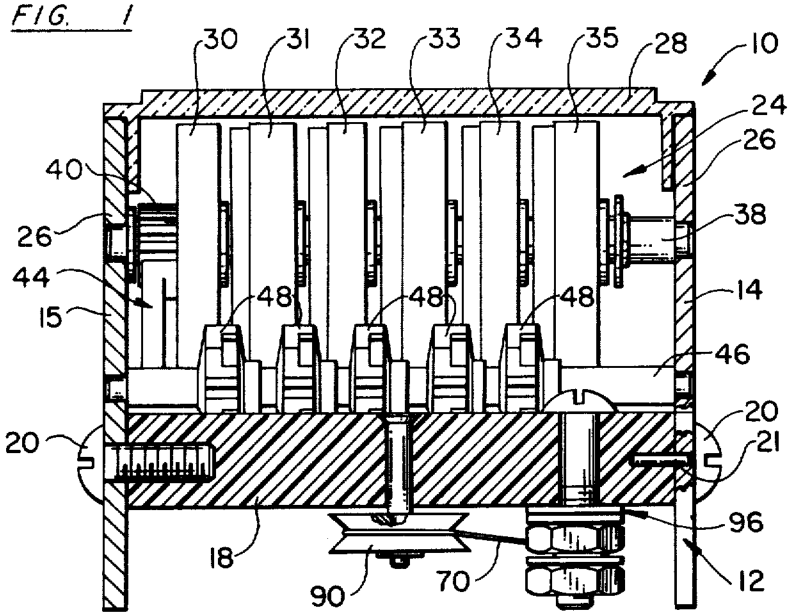
FIG. 1 is a transverse section view, partly broken away and partly in section, of an electrical counting mechanism incorporating an embodiment of the present invention.

Referring now to the drawings in detail wherein like reference numerals indicate like parts throughout the several figures, an electrical counting mechanism 10 incorporating an embodiment of the present invention is shown comprising a frame 12 with a pair of side plates 14, 15 and a pair of base plates 18, 19 to which the side plates 14, 15 are secured by suitable fasteners 20 and locating pins 21. A rotary counter 24 is mounted between upstanding central stanchion portions 26 of the side plates 14, 15, and a viewing window 28 is mounted on the outer ends of the stanchions 26 for reading a bank of six coaxial decade indicator wheels 30–35 of ascending order of significance of the counter 24. The bank of wheels 30–35 are rotatably mounted on a shaft 38 extending between the side plates 14, 15. The lowest order counter wheel 30 is formed with an integral star wheel 40 for indexing the wheel in one-half count increments in a conventional manner with opposed pawls 42, 43 of a pivotal verge 44. Transfer pinions 48 are rotatably mounted on a transfer pinion shaft 46 to transfer counts from each lower order decade wheel to the adjacent higher order decade wheel in a conventional manner.

Figure 4:
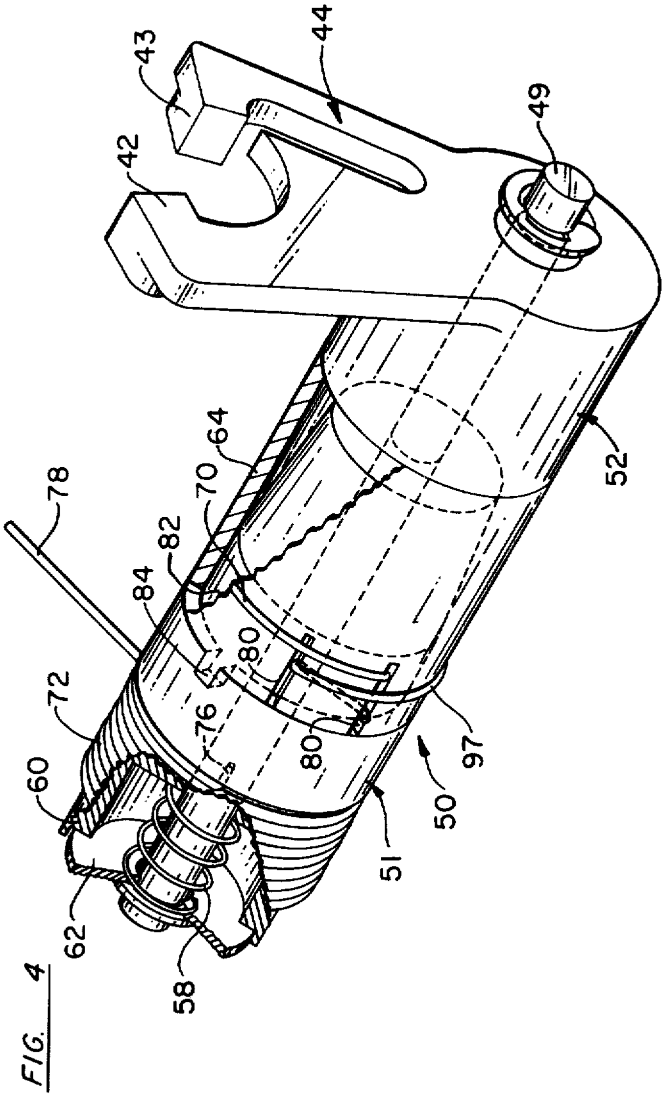
FIG. 4 is an isometric view, partly broken away and partly in section, showing a drive rotor assembly of the electrical counting mechanism.

The pivotal verge 44 forms part of a drive rotor assembly 50 rotatably mounted on a support shaft 49 extending between the side plates 14, 15. As hereinafter described, the drive rotor assembly 50 is connected to be angularly oscillated for indexing the counter 24 in one-half count increments with the verge 44. Coaxial drive and driven rotors 51, 52 respectively of the rotor assembly 50 are mounted in frictional engagement to provide a slip friction clutch for oscillating the verge 44. A compression spring 58 (FIG. 4) is mounted coaxially within a hub 60 of the drive rotor 51 in engagement with a thrush washer 62 to axially bias a cylindrical metal sleeve or drum 64 of the drive rotor 51 into frictional engagement with an axial face of the driven rotor 52. The axial bias is established to transmit a predetermined maximum torque through the friction clutch which is sufficient to index the counter. Accordingly, excess rotation of the drive rotor 51 in either angular direction (during which one of the indexing pawls 42, 43 is bottomed against the star wheel 40) is accommodated by friction clutch slippage to limit the stress on the drive components.

Figure 2:
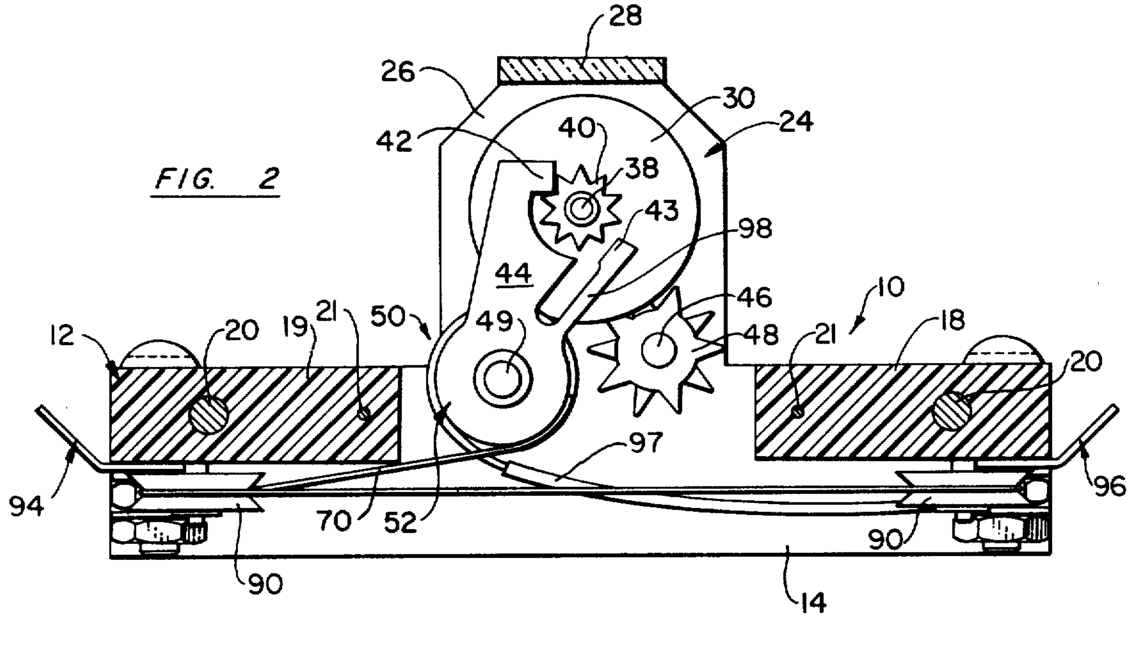
FIG. 2 is a longitudinal section view, partly in section, of the electrical counting mechanism.
Figure 3:
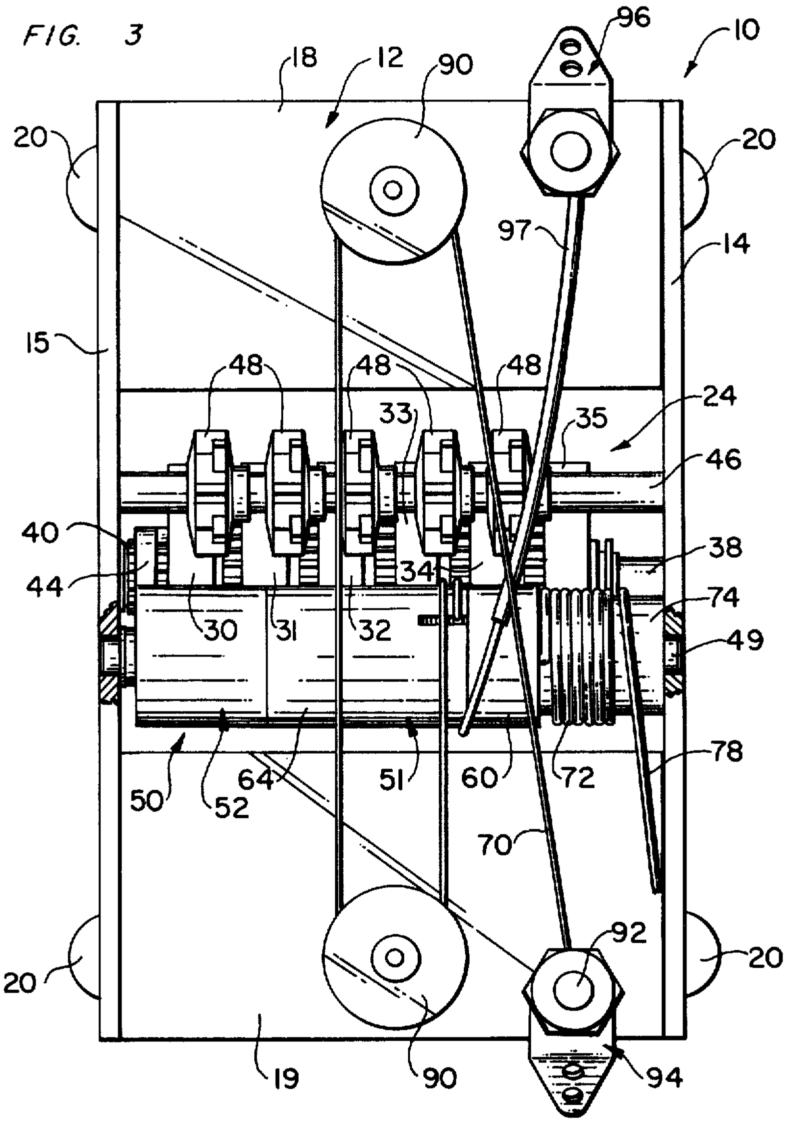
FIG. 3 is a rear view, partly broken away and partly in section, of the electrical counting mechanism.

The drive rotor 51 is connected to be rotated, in the clockwise direction as viewed in FIG. 2, by a tension wire 70 extending partly around and secured to the drive rotor sleeve 64. For that purpose, the sleeve 64 is formed with a pair of angularly spaced and axially extending slots 80 (FIG. 4) for securing one end of the tension wire 70 to the drive rotor 51. Also, the tension wire 70 is mounted to extend sufficiently around the drive rotor sleeve 64 to accommodate maximum possible rotation of the drive rotor 51. The sleeve 64 fits securely onto a reduced cylindrical section 82 of the hub 60 and is keyed to the hub 60 by a pair of diametrically opposed axial projections 84 of the sleeve 64 which are received within conforming slots in the hub 60.

When the tension wire is lengthened as hereinafter described, the drive rotor 51 is rotated, in the counterclockwise direction as viewed in FIG. 2, by a torsion coil spring 72 which encircles a reduced section 74 of the drive rotor hub 60. One end 76 (FIG. 4) of the torsion spring 72 is received within a suitable axial bore in the drive rotor hub 60 and its other end 78 engages the base plate 19 of the frame 12. Accordingly, the torsion spring 72 is operable via the friction clutch to pivot the verge 44, in the counterclockwise direction as view in FIG. 2, to index the counter a first one-half count or step, and the tension wire 70 is operable via the friction clutch to pivot the verge 44 in the opposite angular direction to index the counter the remaining one-half count or step. The relatively constant torsional bias provided by the torsion spring 72 maintains a substantially constant tension in the wire 70 and whereby the angular oscillation of the drive rotor 51 is fully dependent on the operation of the tension wire 70.

A pair of spaced metal pulleys 90 are rotatably mounted on the base plates 18, 19 and the tension wire 70 is fed from the drive rotor sleeve 64 successively around the pulleys 90 and then to a post 92 of an electrical connector 94 to which the tension wire 70 is suitably secured.

A second similar electrical connector 96 mounted on the other base plate 18 of the frame 12 is electrically connected to the tension wire 70 by a suitable loose, flexible, insulated connector wire 97 having an end secured to the metal drum 64 in the manner of the tension wire 70. The base plates 18, 19 are made of plastic or other suitable insulating material to insulate the pulleys 90, connectors 94, 96 and sleeve 64 from each other. Accordingly, the electrical connectors 94, 96 can be connected to a suitable power source to conduct an electrical current along substantially the full length of the tension wire from the wire connector 94 to the drive rotor sleeve 64. The metal pulleys 90 do however short circuit short the sections of the tension wire in engagement with the pulleys 90.

When an appropriate electrical current is conducted through the tension wire, the wire is rapidly heated and is thereby lengthened for rotating the drive rotor 51 with the torsion spring 72 to index the counter a first one-half count. To avoid any possibility of a miscount, the tension wire is heated sufficiently to slip the friction clutch with the tension spring 72 after the first one-half count is completed and with the verge drive pawl 43 bottomed against the star wheel 40. The applied electrical power is then terminated to permit the wire to cool and contract and thereby rotate the drive rotor 51 against the bias of the torsion spring 72 to index the counter a second or remaining one-half count or step. Again, because the angular oscillation of the drive rotor 51 is greater than that of the verge 44, the friction clutch will slip after the verge pawl 42 bottoms against the star wheel 40.

The gauge and length of the tension wire 70 and the applied voltage are established to provide optimum angular oscillation of the drive rotor 51 greater than the predetermined or required angular oscillation of the verge 44. The pulleys 90 are provided to reduce the space required for supporting the tension wire 70, and, of course, additional pulleys could be employed where a longer tension wire is used and/or for mounting the tension wire 70 in less space. Also, the tension wire connectors 94, 96 and wire mounting pulleys 90 can be oriented to provide an optimum configuration for each application.

In the described configuration, the tension wire 70 may, for example, be a standard heating element wire having an alloy of 20% chrome and 80% nickle and an effective length of 18.8 cm and a diameter of 0.0127 cm. In that case, it has been found that a 12 volt source applied for 0.6 seconds duration will effect a first one-half count step as previously described. A succeeding wire cooling phase of approximately 2 seconds will effect a remaining one-half count step as previously described (to produce a total minimum count cycle of 2.6 seconds). During that first heating step or phase, the tension wire will be heated to approximately 340° Centigrade and 12 volt source will produce a current which will decrease from approximately 800 milliamperes to approximately 750 milliamperes as the wire temperature increases. The counting frequency can be increased principally by decreasing the required cooling time and therefore by decreasing the wire current during the first one-half count and varying the length and/or mechanical advantage of the wire 70 accordingly.

Thus, it can be seen that the electrical counting mechanism of the present invention provides an extremely low cost and quiet electrical counter useful as an automobile odometer and in numerous other relatively low speed counter applications. In addition, the electrical wire drive element of the counting mechanism can be mounted to customize the counting mechanism for each application and can be employed with rotary counters of conventional low cost design having, for example, a verge type drive.

As will be apparent to persons skilled in the art, various modifications, adaptations and variations of the foregoing specific disclosure can be made without departing from the teachings of the present invention.

We claim:

1. In an electrical counting device having a rotary counter and electrical indexing means for indexing the rotary counting in stepwise fashion comprising drive means mounted for predetermined oscillation in opposite operative directions thereof for indexing the counter, spring means biasing the drive means in one operative direction thereof, and electrical actuating means operable upon energization thereof to actuate the drive means in the opposite operative direction thereof against the bias of the spring means, the improvement wherein the electrical actuating means comprises an elongated tension wire conductor having a first fixed end and a second end connected to the drive means to retain the drive means against oscillation in its said one operative direction by the spring means, and electrical connection means connected to the conductor wire for conducting an electrical current through the wire to heat and thereby lengthen the wire for oscillating the drive means in its said one operative direction by the spring means and, upon subsequent cooling of the wire for oscillating the drive means in its opposite operative direction by the tension wire.

2. An electrical counting device according to claim 1 wherein the drive means is mounted for angular oscillation and comprises slip clutch means between said second end of the wire and the rotary counter and adapted to slip after said predetermined angular oscillation of the drive means.

3. An electrical counting device according to claim 1 or 2 wherein the electrical indexing means comprises at least one rotary wire pulley and the tension wire extends about each wire pulley intermediate its said fixed and second ends.

4. An electrical counting device according to claim 1 or 2 wherein the rotary counter comprises a bank of coaxial indicator wheels of increasing order of significance, wherein the drive means comprises a drum mounted for angular oscillation about an axis parallel to and laterally offset from the bank of coaxial indicator wheels, wherein the spring means comprises a coil torsion spring connected to the drum for angularly biasing the drum in one angular direction, wherein the tension wire extends at least partly around the drum for rotating the drum in the opposite angular direction and wherein the drive means comprises a pivotal verge, adapted to be oscillated back and forth for indexing the rotary counter in stepwise fashion, coaxial with and axially engageable by the drum to provide a slip clutch drive therebetween for oscillating the verge.

* * * * *